(12) United States Patent
Nakao et al.

(10) Patent No.: US 6,383,373 B1
(45) Date of Patent: May 7, 2002

(54) BIOLOGICAL FILTRATION APPARATUS

(75) Inventors: Akio Nakao; Masanobu Koseki, both of Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/468,874

(22) Filed: Dec. 22, 1999

(30) Foreign Application Priority Data

Dec. 22, 1998 (JP) .......................................... 10-365564

(51) Int. Cl.$^7$ ................................................. C02F 3/10
(52) U.S. Cl. ........................ 210/151; 210/150; 210/279; 210/290; 210/291; 261/95; 261/DIG. 72
(58) Field of Search ................................ 210/617, 618, 210/150, 151, 275, 279, 284, 290, 291; 261/95, DIG. 72

(56) References Cited

U.S. PATENT DOCUMENTS

| | | | |
|---|---|---|---|
| 3,293,174 A | * 12/1966 | Robjohns | 210/150 |
| 3,343,680 A | * 9/1967 | Rice et al. | 210/263 |
| 3,956,128 A | * 5/1976 | Turner | 210/150 |
| 4,604,197 A | * 8/1986 | Louboutin et al. | 210/150 |
| 4,608,181 A | * 8/1986 | Hsiung et al. | 210/786 |
| 4,749,493 A | * 6/1988 | Hicks | 210/617 |
| 5,217,616 A | * 6/1993 | Sanyal et al. | 210/617 |
| 5,800,709 A | * 9/1998 | Smith | 210/617 |
| 5,906,745 A | * 5/1999 | Eto | 210/601 |
| 6,039,866 A | * 3/2000 | Tanaka et al. | 210/136 |
| 6,126,829 A | * 10/2000 | Gunnarsson et al. | 210/616 |

FOREIGN PATENT DOCUMENTS

| AU | B-52076/79 | 1/1980 |
|---|---|---|
| JP | 57-37399 | 8/1982 |

\* cited by examiner

*Primary Examiner*—Peter A. Hruskoci
(74) *Attorney, Agent, or Firm*—Arnet Fox Kintner Plotkin & Kahn, PLLC

(57) ABSTRACT

A biological filtration apparatus comprises:
  a raw water introducing section for introducing raw water as water to be processed;
  a biological filtration section, disposed on the lower side of the raw water introducing section, for biologically purifying/refining/filtrating the raw water so as to yield processed water;
  a support section, disposed on the lower side of the biological filtration section, for supporting the biological filtration section, the support section having a liquid and gas permeability; and
  a water collecting section, disposed on the lower side of the support section, for collecting the processed water;
  the biological filtration section including a packed bed comprising a hollow carrier particle, made of a resin, having a true specific gravity of at least 1.01 g/ml but less than 1.2 g/ml.

13 Claims, 7 Drawing Sheets

US 6,383,373 B1

BIOLOGICAL FILTRATION APPARATUS

BACKGROUND OF THE INVENTION

1. Field of the Invention

The present invention relates to a so-called biological filtration apparatus which simultaneously carries out decomposition of organic impurities by microorganisms and filtration thereof while using primary treatment water or secondary treatment water as raw water (water to be processed) in water purification/refinement processing.

2. Related Background Art

There have conventionally been known biological filtration apparatus using a biological tank filter comprising a microorganism-attached particulate carrier as a fixed bed (packed bed), in which raw water for secondary treatment having completed primary purification processing is introduced into the biological tank filter from the upper part thereof and then moves downward due to gravity, whereas air is diffused from the lower part of the biological tank filter at the same time, the water being purified under the action of aerobic microorganisms as the air moves to the upper part in the countercurrent direction of the movement of the raw water for secondary treatment, and solids are filtered out so as to discharge only the purified liquid. Also, water or air has been supplied from the lower part of the biological tank filter upon an increase in pressure loss in the fixed bed and the like, so as to effect backwashing (e.g., Japanese Patent Publication No. SHO 57-37399).

Such conventional biological filtration apparatus have employed carbonic or inorganic materials having a true specific gravity of about 1.1 to 1.6 such as active carbon (true specific gravity: 1.15 to 1.28), anthracite (true specific gravity: 1.4 to 1.6), and burned clay (chamotte) (true specific gravity: 1.1 to 1.5) as a particulate carrier.

In the case of the above-mentioned biological filtration apparatus for processing the raw water for secondary treatment, however, the particulate carrier packed in the biological tank filter comprises solid particles having a diameter of about 2 to 6 mm, whereby the watering space formed between the carrier particles in the packed bed is so small that the capacity of purification processing may not fully be exerted. Also, the ventilation space for the air diffused for growing the microorganisms attached to the particulate carrier is so small that pressure loss is large.

In order to secure their required watering space, on the other hand, the above-mentioned conventional biological filtration apparatus using the particulate carrier have periodically carried out cleaning of the particulate carrier, so-called backwashing, by causing cleaning air (backwashing air) or cleaning water (backwashing water) to flow in the direction opposite to the usual flow of the water to be processed, since the watering space further decreases as their operation continues, due to the microorganisms, decomposition products, and the like adhering to the particulate carrier. However, the above-mentioned conventional biological filtration apparatus have been problematic in that they necessitate a large amount of backwashing water (usually 40 to 60 $m^3/m^2 \cdot h$) and a large amount of backwashing air (usually 50 to 60 $m^3/m^2 \cdot h$).

SUMMARY OF THE INVENTION

It is an object of the present invention to provide a biological filtration apparatus which is:

(1) capable of enhancing the watering space and ventilation space in the packed bed filled with carrier particles for biological purification processing so as to lower the pressure loss in the biological filtration apparatus, while reducing the amount of backwashing water and backwashing air and the backwashing pump power at the time of backwashing, thereby being able to decrease the number of backwashing operations; and (2) capable of improving the adherence of microorganisms to the surface of carrier particles for biological purification processing, so as to improve the quality of the processed water.

The biological filtration apparatus in accordance with the present invention comprises:

a raw water introducing section for introducing raw water as water to be processed;

a biological filtration section, disposed on the lower side of the raw water introducing section, for biologically purifying/refining/filtrating the raw water so as to yield processed water;

a support section, disposed on the lower side of the biological filtration section, for supporting the biological filtration section, the support section having a liquid and gas permeability; and a water collecting section, disposed on the lower side of the support section, for collecting the processed water;

the biological filtration section including a packed bed comprising a hollow carrier particle, made of a resin, having a true specific gravity of at least 1.01 g/ml but less than 1.2 g/ml, preferably at least 1.01 g/ml but less than 1.1 g/ml.

The hollow carrier particle employed in the biological filtration apparatus of the present invention is not limited to one made of a resin (plastic material) alone, but is preferably formed by a mixture of a resin and an additive for adjusting specific gravity selected from the group consisting of inorganic and organic substances. As such an additive for adjusting specific gravity, one selected from the group consisting of pulp, waste plastics, zeolite, barium sulfate, and slaked lime is preferably used.

As the hollow carrier particle employed in the biological filtration apparatus of the present invention, a tubular carrier particle having an outside diameter of 0.5 to 10 mm, an outside diameter to length ratio (aspect ratio) of 1/0.5 to 1/3, and a thickness of 0.1 to 3 mm is preferably used.

By employing the above-mentioned configuration, the biological filtration apparatus of the present invention yields the following operations and effects:

1) Since the carrier particle used in the biological filtration apparatus of the present invention is made of a resin, a hollow carrier particle having a desirable shape and a true specific gravity within the above-mentioned range is obtained easily. Since this carrier particle is hollow, the packed bed filled with such carrier particles has a higher void ratio and a lower packing density as compared with the packed bed filled with solid carrier particles, whereby the apparatus as a whole has a lighter weight.

2) Since the hollow carrier particle has a larger specific surface area, a larger amount of microorganisms attaches thereto, whereby biological purification and filtration capacities would improve.

3) The microorganisms attached to the hollow inside of the hollow carrier particle are stable, and are washed out very little at the time of backwashing, whereby a stable organism holding capacity is achieved.

4) Since the packed bed filled with the hollow carrier particles has a high void ratio, and the watering space and ventilation space are large, the pressure loss at the time of watering is low. For example, in the case where a cylindrical carrier particle having an outside diameter of 4 mm, an inside diameter of 3 mm, a length of 4 mm, and a true specific gravity of at least 1.01 g/ml but less than 1.2 g/ml is used, under a watering condition substantially the same as that in the case where a solid spherical carrier particle having a particle diameter of 3 mm is used, the pressure loss at the time of watering is small, i.e., ½ to ⅕, and the pressure loss at the time of ventilation is similarly small.

5) Since the carrier particle employed in the biological filtration section of the biological filtration apparatus of the present invention has a true specific gravity relatively lower than that of the carrier particle of the conventional biological filtration apparatus and is hollow, it can sediment at the time of biological processing and can flow to the raw water introducing section with a small amount of water or air at the time of backwashing. As a consequence, the power for supplying, under pressure, the air for backwashing and/or diffusing and the water for backwashing can be lowered.

Namely, the hollow carrier particle in accordance with the present invention can reduce the apparent specific gravity per volume (weight per apparent volume). Therefore, backwashing is possible with a small amount of backwashing water, i.e., 5 to 25 $m^3/m^2 \cdot h$, whereby an amount of backwashing water which is about ⅕ to ½ of the conventional amount of backwashing water is sufficient. Also, backwashing is possible with a small amount of backwashing air, i.e., 15 to 30 $m^3/m^2 \cdot h$, whereby an amount of backwashing air which is about ¼ to ½ of the conventional amount of backwashing air is sufficient.

Since the hollow carrier particle employed in the present invention is made of a resin and has a true specific gravity (at least 1.01 g/ml but less than 1.2 g/ml) which is relatively close to that of water, its apparent specific gravity in water is further closer to water. Therefore, the amount of backwashing water or backwashing air can be reduced at the time of backwashing the biological filtration apparatus, and the pressure for backwashing can be lowered, whereby the backwashing pump power can be reduced, and the number of backwashing operations can be decreased.

6) Since the void ratio in the packed bed of hollow carrier particles in the biological filtration section is high, the real space is so large that the water to be processed (raw water) and the hollow carrier particles come into contact with each other for a longer lime, whereby the biological purification and filtration capacities would improve.

The support section in the biological filtration apparatus of the present invention preferably comprises a planar member and a water collecting nozzle arranged in the planar member, whereas such a water collecting nozzle preferably has a configuration as follows. Namely, the upper part of the water collecting nozzle is exposed into the biological filtration section and is formed with a slit having a liquid and gas permeability. The lower part of the water collecting nozzle is exposed into the water collecting section, and is formed with a water outlet/inlet for discharging the processed water and receiving backwashing water and an air inlet for receiving diffusing and/or backwashing air, whereas the water outlet/inlet and the air inlet communicate with the slit. When the support section thus provided with a water collecting nozzle is used, the processed water tends to be efficiently isolated from the biological filtration section and collected by the water collecting section, and the diffusing air tends to be uniformly supplied to the biological filtration section. At the time of backwashing, on the other hand, there is a tendency of backwashing water and/or air to be supplied efficiently and uniformly to the biological filtration section.

The support section in the biological filtration apparatus of the present invention may comprise a first support portion, comprising a packed bed of filter particles having an average particle size of 0.5 to 2.0 mm, for supporting the biological filtration section; and a second support section, comprising a planar member and a water collecting nozzle arranged in the planar member, for supporting the first support portion. Such a water collecting nozzle preferably has a configuration as follows. Namely, the upper part of the water collecting nozzle is exposed into the first support portion and is formed with a slit having a liquid and gas permeability. The lower part of the water collecting nozzle is exposed into the water collecting section, and is formed with a water outlet/inlet for discharging the processed water and receiving backwashing water and an air inlet for receiving diffusing and/or backwashing air, whereas the water outlet/inlet and the air inlet communicate with the slit. When the support section thus provided with a packed bed of filter particles is used, the solid content tends to be eliminated by this packed bed more reliably.

Further, the support section in the biological filtration apparatus of the present invention may comprise a first support portion, comprising a packed bed of filter particles having an average particle size of 0.5 to 2.0 mm, for supporting the biological filtration section; a second support portion, comprising a packed bed of larger particles having an average particle size greater than that of the filter particles, for supporting the first support portion; and a third support portion, having a liquid and gas permeability, for supporting the second support portion. In this case, the water collecting section is preferably made of a block structure connected to the third support portion and partitioned into a plurality of cells. Preferable as such a third support portion is one comprising a planar member, a water discharge/supply tube for discharging the processed water and supplying backwashing water, and an air supply tube for supplying diffusing and/or backwashing air, whereas the water discharge/supply tube and the air supply tube are arranged in the planar member.

Furthermore, the biological filtration apparatus of the present invention may be configured such that the support section comprises a first support portion, comprising a packed bed of filter particles having an average particle size of 0.5 to 2.0 mm, for supporting the biological filtration section; whereas the water collecting section comprises:
- a second support portion, comprising a packed bed of larger particles having an average particle size greater than that of the filter particles, for supporting the first support portion;
- a first pipe, embedded in the second support portion, for collecting the processed water and introducing backwashing water; and
- a second pipe, embedded in the second support portion, for introducing diffusing and/or backwashing air.

As the filter particle in accordance with the present invention, at least one kind of material selected from the group consisting of filter sand, anthracite, and garnet is preferable. When such a filter particle is used, the filtering capacity tends to improve further.

Though the portion where the diffusing air, backwashing air, or backwashing water is introduced is preferably the water collecting portion as mentioned above, it may be a biological filtration section (preferably in the vicinity of the support section).

DESCRIPTION OF THE PREFERRED EMBODIMENTS

In the following, the present invention will be explained in further detail with reference to embodiments, which are not limitative of the present invention.

Carrier Particle

Figure 1:
FIG. 1 is a perspective view showing a cylindrical carrier particle favorably packed in the biological filtration section of the biological filtration apparatus in accordance with the present invention.
Figure 2:
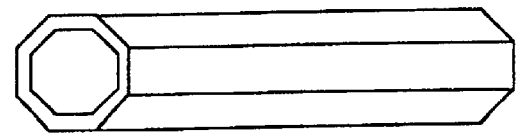
FIG. 2 is a perspective view showing a hollow prism type carrier particle favorably packed in the biological filtration section of the biological filtration apparatus in accordance with the present invention.
Figure 3:
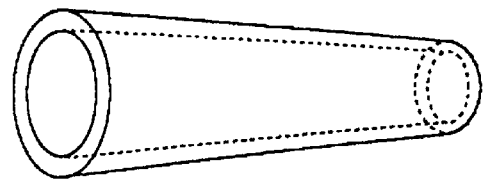
FIG. 3 is a perspective view showing a hollow circular cone type carrier particle favorably packed in the biological filtration section of the biological filtration apparatus in accordance with the present invention.

The carrier particles packed in the biological filtration section of the biological filtration apparatus in accordance with the present invention are made of a resin (plastic) and have a hollow shape. Preferred as such a shape is a tubular form, and examples thereof include cylindrical type (FIG. 1), elliptical tube type, hollow prism type (FIG. 2), star-shaped tube type, hollow circular cone type (FIG. 3), and hollow pyramid type. When the carrier particle has a tubular form, the packing density at the time of packing decreases as the specific surface area increases, whereby the improvement in purification processing capacity, reduction in pressure loss, reduction in amounts of backwashing water and air, and the like tend to be achieved more reliably.

Since a resin is used as a material for carrier particles, such a desirable hollow shape can be made easily with a favorable precision in the present invention. Also, since the carrier particles are made of a resin, those with any true specific gravity can be obtained by use of various resin materials. Therefore, by using a hollow carrier particle, made of a resin, having a true specific gravity of at least 1.01 g/ml but less than 1.2 g/ml, preferably at least 1.01 g/ml but less than 1.1 g/ml, the biological filtration apparatus of the present invention can simultaneously achieve the improvement in purification processing capacity, reduction in pressure loss at the time of watering or ventilation, reduction in amounts of backwashing water and air, and the like.

The resin employed in the present invention is not restricted in particular as long as it can achieve the above-mentioned true specific gravity and has water resistance and wear resistance. A preferred example thereof is a resin having a true specific gravity of 1.04±0.02 g/ml (e.g., synthetic resin such as polypropylene) in a case where the carrier particle is a hollow cylindrical type.

Also, when inorganic and/or organic substances are further mixed with the above-mentioned resin (plastic material) as the material for the carrier particle, the specific gravity adjustment can further be simplified. For example, zeolite, barium sulfate, and slaked lime are favorably usable as such an inorganic substance, and pulp and waste plastic materials as such an organic substance. When a hydrophilic material such as zeolite or pulp is mixed as such, a hydrophilic property is imparted to the carrier particle surface, whereby the carrier particle tends to become more favorable as one for microorganisms. Also, waste plastic materials and pulp materials such as waste paper can be utilized effectively.

Preferably, the hollow carrier particle used in the biological filtration apparatus of the present invention has an outside diameter of 0.5 mm to 10 mm, an outside diameter to length ratio (aspect ratio) of 1/0.5 to 1/3, and a thickness of 0.1 to 3 mm. When such a hollow carrier particle is used, the pressure loss at the time of watering or ventilation tends to decrease more.

Water Collecting Nozzle Type Biological Filtration Apparatus

Figure 4:
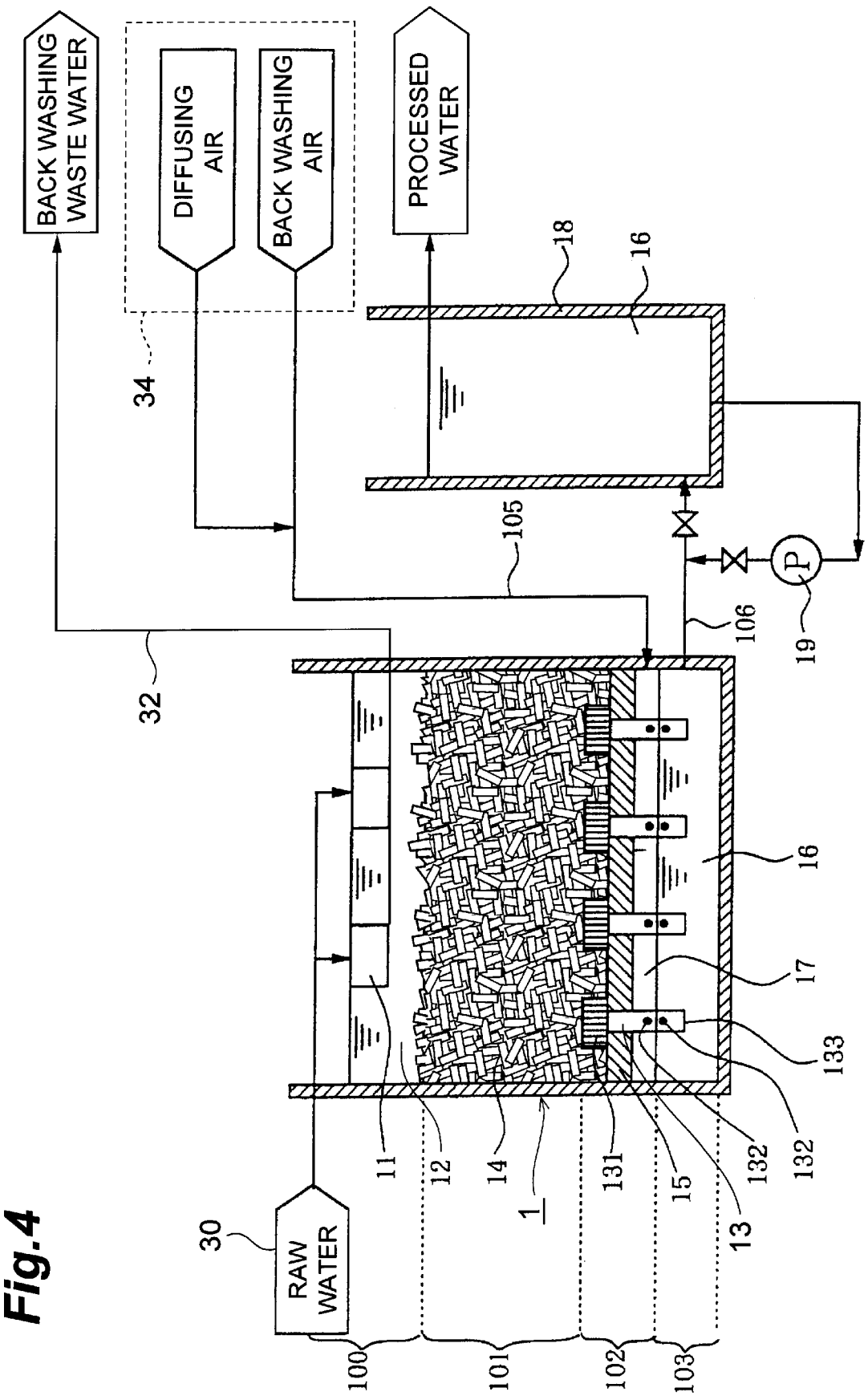
FIG. 4 is a schematic view showing a preferred first embodiment of the biological filtration apparatus in accordance with the present invention.

FIG. 4 shows a first embodiment of the biological filtration apparatus in accordance with the present invention. Since the biological filtration apparatus 1 shown in FIG. 4 is characterized in that it uses water collecting nozzles 13, it is referred to as "water collecting nozzle type biological filtration apparatus" here. The water collecting nozzle type biological filtration apparatus shown in FIG. 4 is mainly composed of a raw water introducing section 100, a biological filtration section 101, a support section 102, and a water collecting section 103.

The raw water introducing section 100 is disposed at the top part of the biological filtration apparatus 1, and is capable of introducing water to be processed (primary treatment water or secondary treatment water) as raw water 12 into the biological filtration section 101, while being able to discharge the contaminant-floating water (backwashing waste water) by allowing it to overflow from the water surface at the time of backwashing. As specific means for exerting these functions in the raw water introducing section 100, a gutter-shaped water collecting trough 11 is preferably disposed in the vicinity of the surface of the raw water 12. In FIG. 4, a raw water supply 30 and a backwashing waste water line 32 are connected to the water collecting trough 11.

The biological filtration section 101 has a bottom part supported by the support section 102, and functions to receive the raw water 12 supplied from the raw water introducing section 100, biologically purify the raw water 12 in a packed bed in which a number of resin-made hollow carrier particles 14 are packed in the biological filtration section 101 so as to refine and filtrate it, thereby yielding processed water.

The support section 102 comprises a floor plate (planar member) 15 and the water collecting nozzles 13, has liquid and gas transmitting functions, and supports the biological filtration section 101. The floor plate 15 separates the biological filtration section 101 and the water collecting section 103 from each other; whereas the water collecting nozzles 13 are embedded in the floor plate 15 at a plurality of locations thereof in a through state, thereby communicating the biological filtration section 101 and the water collecting section 103 to each other. Such a water collecting nozzle 13 has a liquid transmitting function and a gas transmitting function as will be explained in the following.

Figure 5:
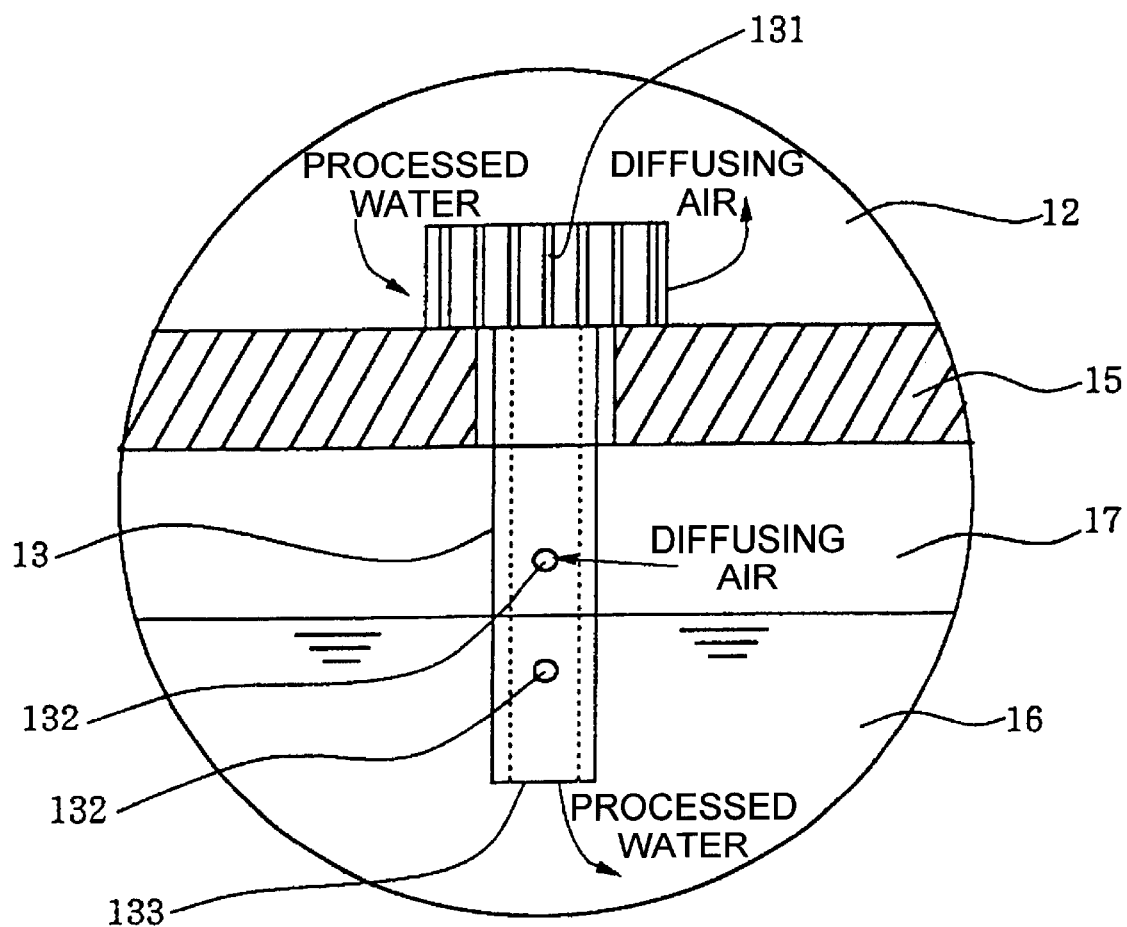
FIG. 5 is an enlarged schematic view of a water collecting nozzle and its surrounding shown in FIG. 4 (at the time of filtering operation)
Figure 6:
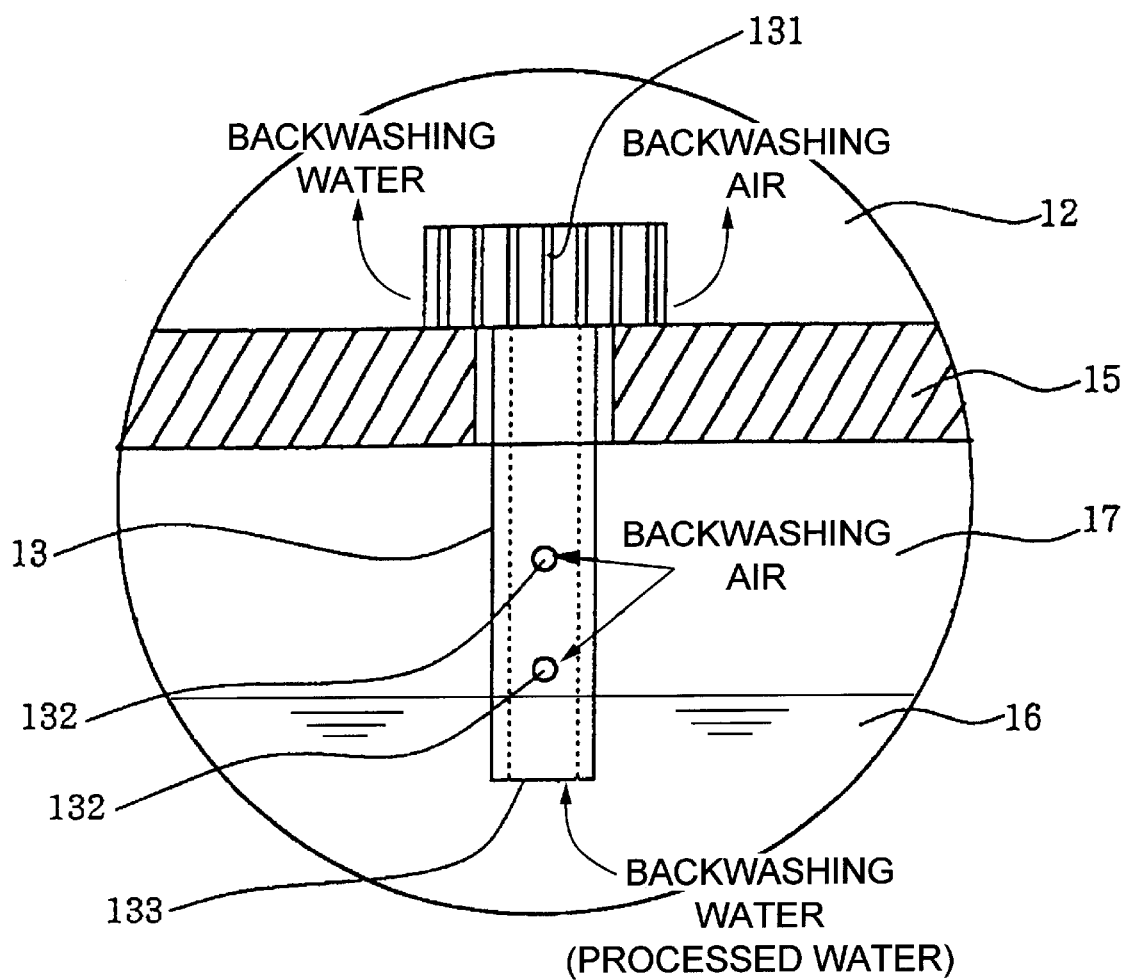
FIG. 6 is an enlarged schematic view of the water collecting nozzle and its surrounding shown in FIG. 4 (at the time of backwashing operation)

FIGS. 5 and 6 show an enlarged portion about the water collecting nozzle 13, illustrating the state at the time of filtering operation and the state at the time of backwashing operation, respectively. The upper part of the water collecting nozzle 13 projects so as to be exposed to the biological filtration section 101 and is provided with a number of slits 131 having a liquid transmitting function and a gas transmitting function. The slits 131 have a function of filtrating a liquid (processed water) so as to make it pass through the water collecting nozzle 13 to the water collecting section 103, and a function of transmitting therethrough toward the biological filtration section 101 a diffusing gas such as air blown upward from the lower part of the water collecting nozzle 13. The lower part of the water collecting nozzle 13 projects so as to be exposed to the water collecting section 103 and is provided with air inlets 132 adapted to let in the diffusing and/or backwashing air. Also, the bottom part of the water collecting nozzle 13 is provided with a water outlet/inlet 133 for discharging filtrated processed water 16 to the water collecting section 103 and supplying water for backwashing the carrier particles 14 to the biological filtration section 101 by way of the water collecting nozzle 13.

The water collecting section 103 is a space located in the lower part of the biological filtration apparatus 1 and separated from the biological filtration section 101 by the support section 102, and stores the processed water 16 filtrated through the biological filtration section 101. In the upper part of the water collecting section 103, an air layer 17 usually exists in the space extending from the surface of the processed water 16 to the floor plate 15 thereabove. To the air layer 17, an air supply line 105 is connected so as to introduce the diffusing or backwashing air from a blower 34 connected to the outside of the biological filtration apparatus 1. Also, an external processed water tank 18 is connected to the water collecting section 103 by way of a line 106, and piping is configured such that the processed water 16 can be fed from the water collecting section 103 to the processed water tank 18 at the time of filtering operation, whereas the processed water 16 can be transported from the processed water tank 18 to the water collecting section 103 by a backwashing pump 19 at the time of backwashing.

A method of biologically filtrating raw water by use of the water collecting nozzle type biological filtration apparatus shown in FIG. 4 will now be explained. The raw water 12 flows into the raw water introducing section 100 from the water collecting trough 11 and comes into contact with the resin-made hollow carrier particles 14 packed in the biological filtration section 101. After being purified under the action of microorganisms, the water is collected as the processed water 16 into the water collecting section 103 by way of the water collecting nozzles 13 and is transported to the processed water tank 18.

Further, when the raw water 12 is subjected to watering processing (filtering processing), the diffusing air is fed to the air layer 17 under the floor plate 15, and is introduced to the biological filtration section 101 from the air inlets 132 of the water collecting nozzles 13, so as to be diffused (FIG. 5). While passing between the carrier particles 14 in the biological filtration section 101, the raw water 12 comes into contact with the diffused air, whereby oxygen in the air dissolves into the raw water 12 and is used for growing aerobic microorganisms.

If the carrier particles 14 are contaminated due to microorganisms and the like adhering thereto in excess during a continuous operation of the biological filtration apparatus, thus requiring cleaning, then the backwashing pump 19 is operated so as to supply only the processed water 16 by way of the processed water discharging/introducing line 106, or supply the backwashing air by way of the diffusing/backwashing air introducing line 105 together with the processed water 16, thereby cleaning the carrier particles 14.

At this time, the clean processed water 16 is supplied from the processed water tank 18 to the water collecting section 103 by the backwashing pump 19, and is fed into the water collecting nozzles 13 via the water outlet/inlet 133 thereof. Then, by way of the slits 131, the processed water 16 for backwashing is supplied to the biological filtration section 101, whereby the carrier particles 14 are cleaned (FIG. 6). When the processed water 16 for backwashing is supplied in excess, contaminants such as microorganisms liberated from the carrier particles 14 overflow as contaminant-floating water (backwashing waste water) from the water surface into the water collecting trough 11, so as to be collected and discarded. On the other hand, the backwashing air is supplied to the biological filtration section 101 via the same route as that of the diffusing air, so as to clean the carrier particles 14.

Figure 7:
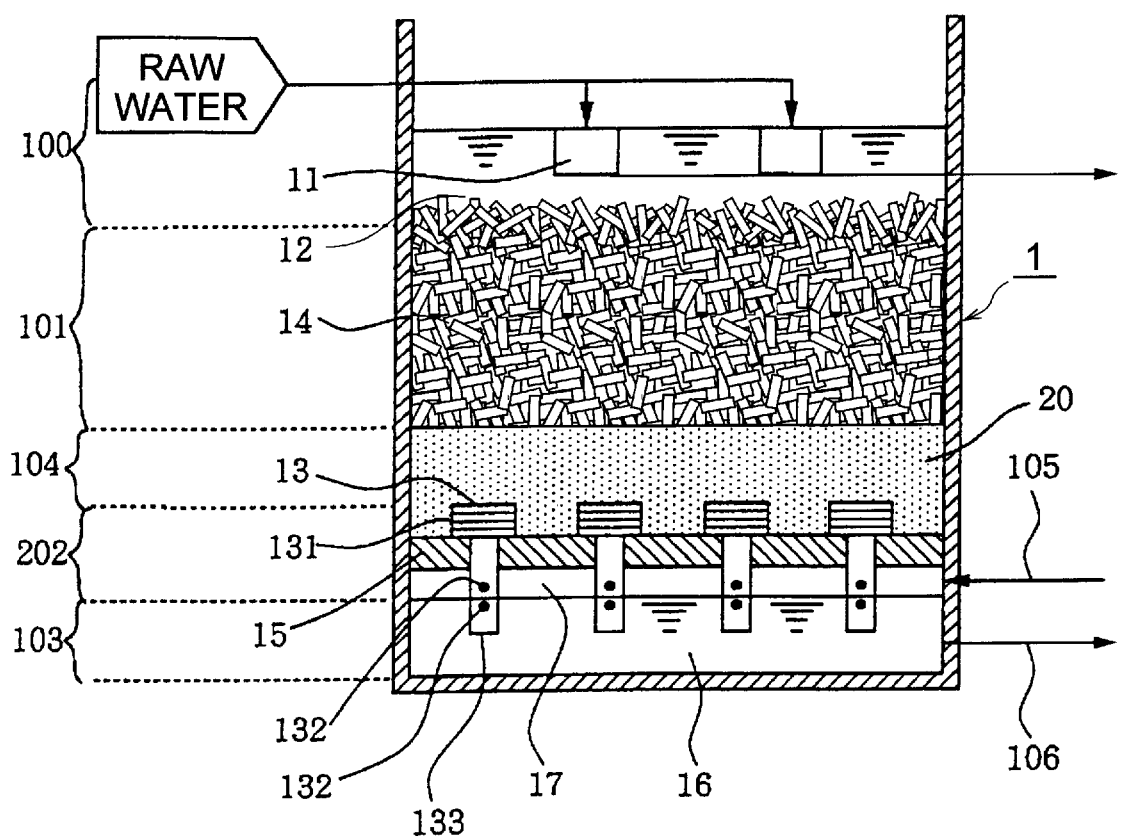
FIG. 7 is a schematic view showing a preferred second embodiment of the biological filtration apparatus in accordance with the present invention.

Support Section/Water Collecting Nozzle Complex Type Biological Filtration Apparatus FIG. 7 shows a second embodiment of the biological filtration apparatus in accordance with the present invention. The biological filtration apparatus 1 shown in FIG. 7 is one in which a support section 104, which comprises a packed bed of filter particles 20 and supports the biological processing section 101, is further combined with the above-mentioned collecting water nozzle type biological filtration apparatus. The biological filtration apparatus shown in FIG. 7 is referred to as "support section/water collecting nozzle complex type biological filtration apparatus" here.

In the support section/water collecting nozzle complex type biological filtration apparatus shown in FIG. 7, 104 is a minute particle packing support section (first support portion), in which filter particles 20 having an average particle size of 0.5 to 2.0 mm are packed so as to form a layer, for supporting the biological filtration section 101. As the filter particles 20, at least one kind of material selected from filter sand, anthracite, and garnet can be used favorably. The minute particle packing support section 104 is supported by a second support portion 202 in which water collecting nozzles 13 are embedded in a liquid- and gas-impermeable floor plate (planar member) 15. The second support portion 202 in the biological filtration apparatus shown in FIG. 7 corresponds to the support section 102 in the biological filtration apparatus shown in FIG. 4. The upper part of each water collecting nozzle 13 is exposed to the minute particle packing support section 104 and is formed with slits 131 having a liquid transmitting function and a gas transmitting function.

The lower part of the water collecting nozzle 13 is exposed to the water collecting section 103 and is provided with not only a water outlet/inlet 133 adapted to discharge filtrated processed water 16 and receive backwashing water, but also air inlets 132 adapted to receive the diffusing and/or backwashing air. The other parts of configuration, i.e., raw water introducing section 100, biological filtration section 101, diffusing/backwashing air introducing line 105, processed water discharging/introducing line 106, and so forth, are similar to those of the biological filtration apparatus shown in FIG. 4.

Water Collecting Block A Type Biological Filtration Apparatus

Figure 8:
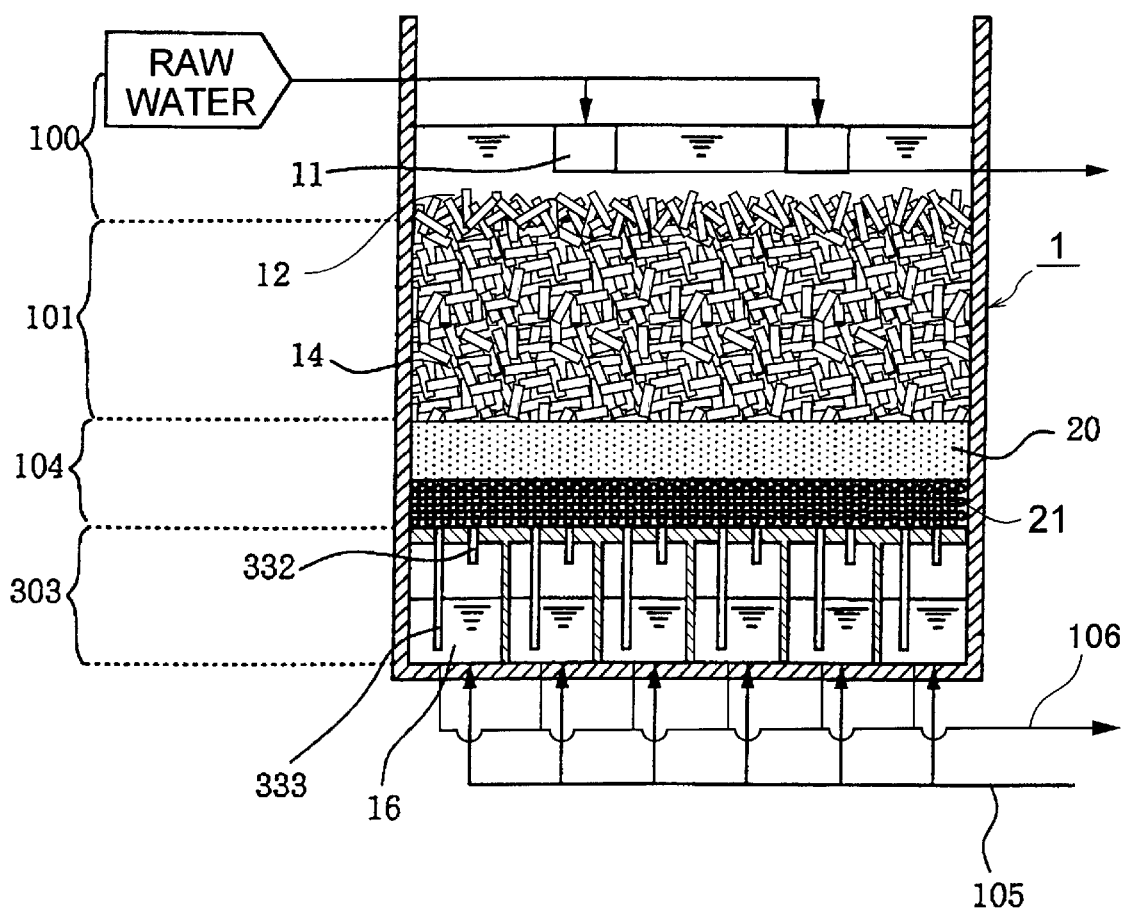
FIG. 8 is a schematic view showing a preferred third embodiment of the biological filtration apparatus in accordance with the present invention.

FIG. 8 shows a third embodiment of the biological filtration apparatus in accordance with the present invention. In the biological filtration apparatus 1 shown in FIG. 8, a minute particle packing support section (first support portion) 104 comprising a packed bed of filter particles 20 having an average particle size of 0.5 to 2.0 mm is disposed in place of the support section 102 having water collecting nozzles in the biological filtration apparatus shown in FIG. 4, and a water collecting block section (water collecting section) 303, constituted by a block structure partitioned into a plurality of cells, functioning to support the biological filtration section 101 and minute particle packing support section 104 is disposed on the water collecting side of the minute particle packing support section 104. The biological filtration apparatus shown in FIG. 8 is referred to as "water collecting block A type biological filtration apparatus" here.

Examples of the filter particles 20 usable in the minute particle packing support section 104 in the water collecting block A type biological filtration apparatus shown in FIG. 8 include at least one kind of material selected from the group consisting of gravel, filter sand, anthracite, and garnet. In the minute particle packing support section 104, a support bed (second support portion) 21 comprising larger particles with a greater diameter (average particle size) is disposed in the lower part so as to keep the filter particles 20 from falling down to the water collecting block section 303. An example of such a larger particle is gravel having an average particle size of 10 mm to 15 mm.

In the water collecting block A type biological filtration apparatus shown in FIG. 8, the minute particle packing support section 104 is supported on the water collecting block section 303, and the upper plate of water collecting blocks constitutes a third support portion for supporting the second support portion. In the water collecting block section 303, water discharge/supply tubes 333 for transporting the processed water 16 or backwashing water and air supply tubes 332 for transporting the diffusing or backwashing air are embedded in an assembly comprising a plurality of liquid- and gas-impermeable blocks. The water collecting block section 303 stores therein the processed water 16 filtrated from the minute particle packing support section 104 and collected by way of the water discharge/supply tubes 333.

Though the other parts of configuration, i.e., raw water introducing section 100, biological filtration section 101, diffusing/backwashing air introducing line 105, processed water discharging/introducing line 106, and so forth, are similar to those of the biological filtration apparatus shown in FIG. 4, the processed water discharging/introducing line 106 is connected to each block.

Water Collecting Pipe Type Biological Filtration Apparatus

Figure 9:
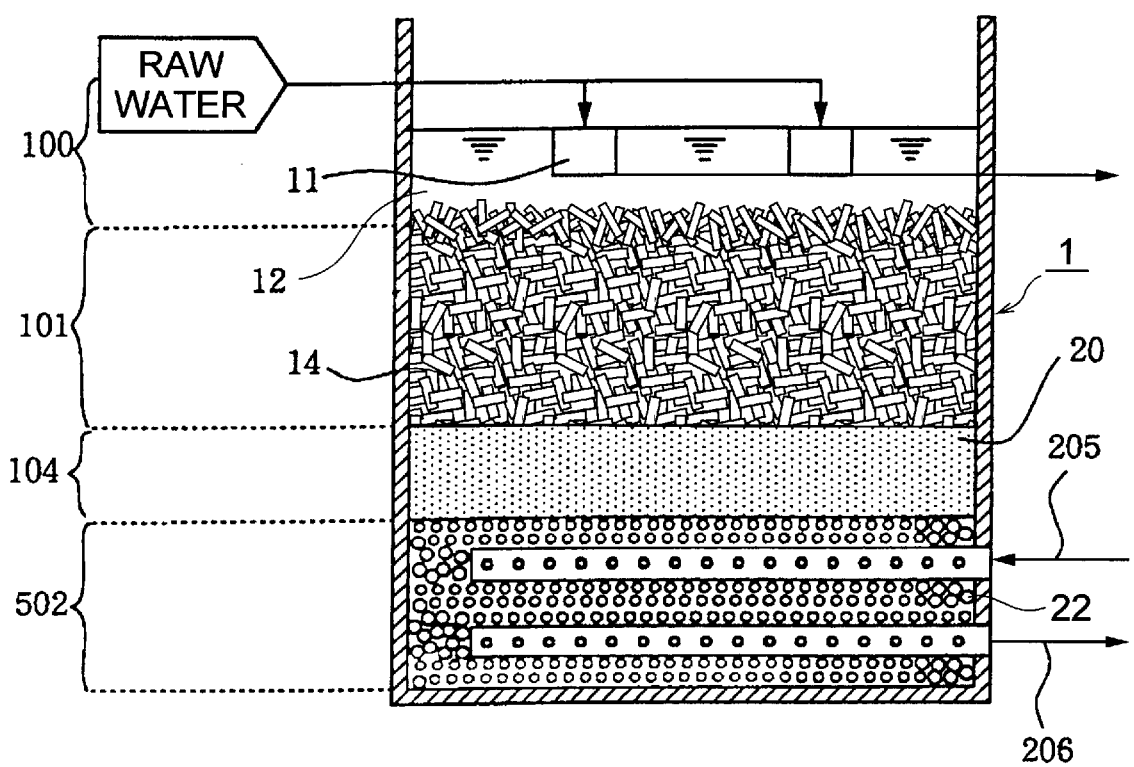
FIG. 9 is a schematic view showing a preferred fourth embodiment of the biological filtration apparatus in accordance with the present invention.

FIG. 9 shows a fourth embodiment of the biological filtration apparatus in accordance with the present invention. In the biological filtration apparatus shown in FIG. 9, a second support portion 502 for supporting the minute particle packing support section (first support portion) 104, a water collecting pipe (first pipe) 206 for collecting processed water or introducing backwashing water, and an air pipe (second pipe) 205 for introducing the diffusing and/or backwashing air are disposed in place of the water collecting block section 303 in the water collecting block A type biological filtration apparatus shown in FIG. 8. The biological filtration apparatus shown in FIG. 9 is referred to as "water collecting pipe type biological filtration apparatus" here.

The second support portion 502 is filled with larger particles 22 having a diameter (average particle size) greater than that of filter particles 20, e.g., gravel having an average particle size of 10 mm to 15 mm; whereas the water collecting pipe 206, adapted to collect the filtrated processed water, for discharging the backwashing water, and the air pipe 205 for discharging the diffusing and/or backwashing air are embedded in the packed bed. In the water collecting pipe type biological filtration apparatus, the minute particle packing support section (first support portion) 104 constitutes a support section, whereas the second support portion 502, the first pipe 206, and the second pipe 205 constitute a water collecting section. The other parts of configuration, i.e., raw water introducing section 100, biological filtration section 101, and the like, are similar to those of the biological filtration apparatus shown in FIG. 4.

EXAMPLES

Example

By use of the water collecting nozzle type biological filtration apparatus of the present invention shown in FIG. 4, biological filtration was carried out under the following condition:

Biological tank filter volume: 4.5 m$^3$

Filtration area: 0.9 m$^2$

Filler:
   material: synthetic resin (main ingredient: polypropylene)
   dimension: outside diameter of 4 mm—inside diameter of 3 mm×length of 4 mm
   true specific gravity: 1.04

Packed bed thickness: 2 m

Water collecting nozzle density: 25/m$^2$

Rate of filtration: 200 m$^3$/m$^2$·day

Amount of diffusing air: 8 m$^3$/m$^2$·h

Raw water (secondary treatment water):
   BOD: 6.6 to 7.8 mg/l
   COD: 9.0 to 13.2 mg/l
   SS: 1.0 to 1.8 mg/l
   NH$_4$—N: 1 to 9 mg/l As a result, the pressure loss at the time of watering was 300 mm, the pressure loss at the time of ventilation was 360 mm, the amount of backwashing water was 20 m$^3$/m$^2$·h, the amount of backwashing air was 25 m$^3$/m$^2$·h, and the frequency of backwashing was once per 2 days. Also, the property of the processed water was as follows:

Processed water:
   BOD: 3.1 to 4.8 mg/l
   COD: 6.8 to 9.0 mg/l
   SS: 0.4 to 0.9 mg/l
   NH$_4$—N: 0 to 3 mg/l Comparative Example Biological filtration was carried out in a manner similar to that in the above-mentioned Example except that the filler was replaced by the following conventional one:

Filler:

material: solid particles made of ceramics dimension: average particle size of 6 mm (particle size: 4 to 8 mm)

true specific gravity: 1.15

As a result, the pressure loss at the time of watering was 400 mm, the pressure loss at the time of ventilation was 500 mm, the amount of backwashing water was 50 m$^3$/m$^2$·h, the amount of backwashing air was 60 m$^3$/m$^2$·h, and the frequency of backwashing was once per day. Also, the property of the processed water was as follows:

Processed water:
BOD: 4.2 to 5.5 mg/l
COD: 7.3 to 10.2 mg/l
SS: 0.6 to 1.1 mg/l
$NH_4$—N: 0 to 4 mg/l Since the carrier particles used for biological processing in the biological filtration apparatus of the present invention are made of a resin and have a hollow shape, the pressure loss at the time of supplying the raw water for processing is lower than that in the case with solid ones conventionally used for biological filtration processing.

Also, since the carrier particles used for biological processing in the biological filtration apparatus of the present invention are made of a resin and have a hollow shape, the microorganisms attached to the hollow inside are washed out only very little at the time of backwashing, whereby the particles can stably be used for biological processing as a carrier to which organisms attach.

Further, since the carrier particles used for biological processing in the biological filtration apparatus of the present invention have a true specific gravity of at least 1.01 g/ml but less than 1.2 g/ml, thus being lighter than conventional carrier particles used for biological processing, and have a hollow shape, the amount of backwashing water can be kept low, and the amount of cleaning air can be kept low.

Therefore, the carrier particles used in the biological filtration apparatus of the present invention are suitable for rapid filtration, and can be utilized as a substitute for sand filters for water supply, sewage, industrial effluent, industrial water, and the like, or particles employed in a purifying apparatus for water contaminated with chemical substances.

What is claimed is:

1. A biological filtration apparatus comprising:
    a raw water introducing section for introducing raw water as water to be processed;
    a biological filtration section, disposed on the lower side of said raw water introducing section, for biologically purifying/refining/filtrating said raw water so as to yield processed water;
    a support section, disposed on the lower side of said biological filtration section, for supporting said biological filtration section, said support section having a liquid and gas permeability; and
    a water collecting section, disposed on the lower side of said support section, for collecting said processed water;
    said biological filtration section includes a packed bed comprising a hollow carrier particle, made of a resin, having a true specific gravity of at least 1.01 g/ml but less than 1.2 g/ml; and
    said support section comprises a planar member and a water collecting nozzle which is arranged in said planar member and by which the biological filtration section communicates with the water collecting section;
    said water collecting nozzle having a lower part formed with a water outlet/inlet for discharging said processed water and for receiving backwashing water and an air inlet for receiving diffusing and/or backwashing air.

2. A biological filtration apparatus according to claim 1, wherein said hollow carrier particle is formed by a mixture of a resin and an additive for adjusting specific gravity selected from the group consisting of inorganic and organic substances.

3. A biological filtration apparatus according to claim 2, wherein said additive for adjusting specific gravity is selected from the group consisting of pulp, waste plastics, zeolite, barium sulfate, and slaked lime.

4. A biological filtration apparatus according to claim 1, wherein said hollow carrier particle is a tubular carrier particle having an outside diameter of 0.5 to 10 mm, an outside diameter to length ratio of 1/0.5 to 1/3, and a thickness of 0.1 to 3 mm.

5. A biological filtration apparatus according to claim 1, wherein
    said water collecting nozzle has an upper part exposed into said biological filtration section and formed with a slit having a liquid and gas permeability, and
    said water outlet/inlet and said air inlet communicate with said slit.

6. A biological filtration apparatus according to claim 1, wherein said support section comprises;
    a first support portion, comprising a packed bed of filter particles having and average particle size of 0.5 to 2.0 mm, for supporting said biological filtration section; and
    a second support portion, comprising said planar member and said water collecting nozzle, for supporting said first support portion;
    said water collecting nozzle having an upper part exposed into said first support portion and formed with a slit having a liquid and gas permeability, and
    said water outlet/inlet and said air inlet communicate with said slit.

7. A biological filtration apparatus according to claim 6, wherein said filter particles comprise at least one kind of material selected from the group consisting of filter sand, anthracite, and garnet.

8. A biological filtration apparatus according to claim 1, wherein said hollow carrier particle has a true specific gravity of at least 1.01 g/ml but less than 1.1 g/ml.

9. A biological filtration apparatus according to claim 1, wherein said biological filtration section consists essentially of said packed bed of said hollow carrier particles having a true specific gravity of at least 1.01 g/ml but less than 1.2 g/ml.

10. A biological filtration apparatus comprising:
    a raw water introducing section for introducing raw water as water to be processed;
    a biological filtration section, disposed on the lower side of said raw water introducing section, for biologically purifying/refining/filtrating said raw water so as to yield processed water;
    a support section, disposed on the lower side of said biological filtration section, for supporting said biological filtration section, said support section having a liquid and gas permeability; and
    a water collecting section, disposed on the lower side of said support section, for collecting said processed water;
    said biological filtration section includes a packed bed comprising a hollow carrier particle, made of a resin, having a true specific gravity of at least 1.01 g/ml but less that 1.2 g/ml; and
    said water collecting section comprising a block structure connected to said support section and partitioned into a plurality of cells; and
    said support section comprising a planar member, a water discharge/supply tube for discharging said processed water and supplying backwashing water, and an air supply tube for supplying diffusing and/or backwashing air, said water discharge/supply tube and said air supply tube being arranged in said planar member.

11. A biological filtration apparatus according to claim 10, wherein said filter particles comprise at least one kind of material selected from the group consisting of filter sand, anthracite, and garnet.

12. A biological filtration apparatus comprising:

a raw water introducing section for introducing raw water as water to be processed;

a biological filtration section, disposed on the lower side of said raw water introducing section, for biologically purifying/refining/filtrating said raw water so as to yield processed water;

a support section, disposed on the lower side of said biological filtration section, for supporting said biological filtration section, said support section having a liquid and gas permeability; and a water collecting section, disposed on the lower side of said support section, for collecting said processed water;

said biological filtration section includes a packed bed comprising a hollow carrier particle, made of a resin, having a true specific gravity of at least 1.01 g/ml but less than 1.2 g/ml; and said support section comprises a first support portion, comprising a packed bed of filter particles having an average particle size of 0.5 to 2.0 mm, for supporting said biological filtration section;

said water collecting section comprising:

a second support portion, comprising a packed bed of larger particles having an average particle size greater than that of said filter particles, for supporting said first support portion;

a first pipe, embedded in said second support portion, for collecting said processed water and introducing backwashing water; and a second pipe, embedded in said second support portion, for introducing diffusing and/or backwashing air.

13. A biological filtration apparatus according to claim 12, wherein said filter particles comprise at least one kind of material selected from the group consisting of filter sand, anthracite, and garnet.

* * * * *